United States Patent
Ahmad et al.

(10) Patent No.: US 10,169,271 B1
(45) Date of Patent: Jan. 1, 2019

(54) DIRECT MEMORY ACCESS DESCRIPTOR

(71) Applicant: Xilinx, Inc., San Jose, CA (US)

(72) Inventors: Sagheer Ahmad, Cupertino, CA (US); Nishit Patel, San Jose, CA (US); James J. Murray, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 938 days.

(21) Appl. No.: 14/526,403

(22) Filed: Oct. 28, 2014

(51) Int. Cl.
   *G06F 13/28* (2006.01)
   *G06F 13/36* (2006.01)
   *G06F 12/1081* (2016.01)

(52) U.S. Cl.
   CPC .......... *G06F 13/28* (2013.01); *G06F 12/1081* (2013.01)

(58) Field of Classification Search
   CPC .. G06F 12/0835; G06F 12/1081; G06F 13/28; G06F 2213/2802
   USPC ...................... 710/308, 22–23, 26
   See application file for complete search history.

(56) References Cited

U.S. PATENT DOCUMENTS

| | | | | |
|---|---|---|---|---|
| 6,327,615 B1* | 12/2001 | Kasper | ................... | H04L 49/90 709/213 |
| 6,912,217 B1* | 6/2005 | Vogel | ................... | H04J 3/1617 370/389 |
| 7,603,496 B2* | 10/2009 | Wrigley | ................... | G06F 5/065 710/113 |
| 7,908,335 B1* | 3/2011 | Citterelle | ............... | G06F 13/426 709/212 |
| 8,073,990 B1* | 12/2011 | Baron | ..................... | G06F 13/28 710/22 |
| 9,053,093 B1* | 6/2015 | Nguyen | ................... | G06F 13/28 |
| 2001/0049755 A1* | 12/2001 | Kagan | ..................... | G06F 13/28 710/22 |
| 2002/0099919 A1* | 7/2002 | Normant | ............... | G06F 12/023 711/170 |
| 2003/0046458 A1* | 3/2003 | Morishima | ............. | G06F 13/28 710/22 |
| 2004/0015621 A1* | 1/2004 | Tanaka | ..................... | G06F 13/28 710/22 |
| 2005/0033874 A1* | 2/2005 | Futral | ..................... | G06F 13/28 710/22 |
| 2014/0317333 A1* | 10/2014 | Dorst | ..................... | G06F 13/28 710/308 |

* cited by examiner

*Primary Examiner* — Farley Abad
*Assistant Examiner* — Henry W Yu
(74) *Attorney, Agent, or Firm* — LeRoy D. Maunu (57) ABSTRACT

Methods and systems are disclosed for transferring data using descriptors to reference memory locations at which data is to be written to or read from. Each descriptor references a respective linked list of descriptor blocks. Each of the descriptor blocks includes a contiguous portion of the memory that stores a plurality of addresses, at which data is to be written to or read from. In response to receiving the data transfer request, a set of data is transferred from a first set of addresses specified in a first descriptor to a second set of addresses specified in a second descriptor by traversing the linked lists of descriptor blocks in the first and second descriptors.

18 Claims, 5 Drawing Sheets

DIRECT MEMORY ACCESS DESCRIPTOR

FIELD OF THE INVENTION

The disclosure generally relates to communication circuits and more particularly to direct memory access communication circuits.

BACKGROUND

Direct memory access (DMA) is a method of transferring data from one location to another location without the intervention of a device that initiates the data transfer. DMA transfers of data are performed by a DMA controller, which includes specialized hardware for conducting the DMA transfers quickly and efficiently. This allows for large data transfers to be conducted without imposing a significant burden on the device that initiated the data transfer. DMA data transfers are used for data transfers between various devices, e.g., input/output devices and/or memories.

SUMMARY

A DMA system is disclosed. The system includes a memory, first and second buffers and a DMA circuit coupled to the memory and first and second buffers. The DMA circuit is configured to receive a data transfer request including a first descriptor and a second descriptor. The first descriptor indicates a first set of addresses in the first buffer from which a set of data is to be read. The second descriptor indicates a second set of addresses in the second buffer to which the set of data is to be written. The first descriptor references a first linked list of descriptor blocks and the second descriptor references a second linked list of descriptor blocks. Each of the descriptor blocks includes a contiguous portion of the memory that stores a plurality of addresses of the first or second sets of addresses. In response to receiving the data transfer request, the DMA circuit transfers the set of data from the first set of addresses in the first buffer to the second set of addresses in the second buffer by traversing the first and second linked lists of descriptor blocks.

A method is also disclosed for transferring a set of data from a source buffer. A first descriptor is provided to a DMA circuit. The first descriptor indicates a set of addresses in the source buffer at which the set of data is located. The first descriptor references a first linked list of a plurality of descriptor blocks. Each descriptor block includes a contiguous portion of a memory that stores a plurality of descriptor entries. Using the DMA circuit, a first memory location of a first descriptor block of the first linked list is selected as a current first location and a first set of operations is performed. In performing the first set of operations, data is read from an address in the source buffer referenced by the descriptor entry at the current first location. In response to the first descriptor including additional descriptor entries and the next memory location being the last memory location in a descriptor block, a memory location referenced by the next memory location is selected as a new current first location. In response to the first descriptor including additional descriptor entries and the next memory location not being the last memory location in a descriptor block, the next memory location is selected as the new current first location. After selecting a new current first location, the first set of operations is repeated by the DMA circuit.

A method is also disclosed for creation of a descriptor for a data transfer. A contiguous block of memory is allocated for a first descriptor block having a plurality of memory locations. A starting address and size of a first data segment in a source buffer is stored at the first memory location of the first descriptor block. The next memory location is then selected as a current first memory location. For each subsequent data segment of the data transfer, if the current first memory location is not the last memory location of the descriptor block, a starting address and size of the subsequent data segment is stored at the current first memory location. Otherwise, if the current first memory location is the last memory location of the descriptor block, an additional contiguous block of memory is allocated for an additional descriptor block having a plurality of memory locations. The first memory location of the additional descriptor block is then selected as the current first memory location and a starting address and size of the subsequent data segment is stored at the current first memory location.

Other features will be recognized from consideration of the Detailed Description and Claims, which follow.

BRIEF DESCRIPTION OF THE DRAWINGS

Various aspects and features of the system and processes will become apparent upon review of the following detailed description and upon reference to the drawings in which.

DETAILED DESCRIPTION OF THE DRAWINGS

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein.

One type of DMA transfer, referred to as scatter-gather, transfers a data sequence from a first set of data buffer locations to a second set of data buffer locations. A data buffer is a portion of a physical memory that is allocated for storage of data, for example, while the data is being transferred from one location to another. The buffer locations of the first set are specified in a source descriptor and the memory locations of the second set are specified in a destination descriptor. When a DMA transfer is initiated, the DMA engine may be provided with pointers to locations in a memory where the source and destination descriptors are stored. In some implementations, the source and destination descriptors may be stored in the same memory that is referenced by either the first or second sets of buffer locations. In some other implementations, the source and destination descriptors may be stored in a memory that is different from the buffers referenced by the first and second sets of buffer locations. Using the pointers, a DMA engine traverses the source descriptor to determine the first set of memory locations from which data is to be read, and traverses the destination descriptor to determine the second set of memory locations to which the data is to be written.

In some previous descriptor implementations, entries of a descriptor are stored back to back in a contiguous block of memory. A block of memory is contiguous if all memory addresses in the block are adjacent to one another. This approach is easy to implement and is memory efficient. However, the number of data segments of data transfers is limited by the size of the contiguous block of memory.

Some other previous descriptor implementations store entries of each descriptor in a linked list. Each entry of the linked list includes a first address to point to a buffer/memory location at which data is to be read or written. Each entry in the linked list also includes a second address where the next entry of the linked list is located. Use of the linked list improves flexibility by allowing descriptors to be stored in non-contiguous memory and also allows the size of each descriptor to be expanded to accommodate data transfers having exceptionally large numbers of data segments. However, each entry in a linked list implemented descriptor may require up to twice as much memory than an entry of a descriptor having entries arranged linearly in a contiguous portion of memory.

In one or more implementations, a DMA engine is configured to perform data transfers using descriptors having multiple descriptor blocks arranged in a linked list, where each descriptor block can store a plurality of descriptor entries back to back in a respective contiguous block of memory. For ease of reference, this descriptor structure may be referred to as a hybrid descriptor. The hybrid descriptor provides the flexibility to expand memory for storage of descriptors having a large number of entries, but with less memory overhead than a linked list of individual descriptor entries. For instance, using the hybrid descriptor, memory requirements needed to store the descriptor entries can be nearly halved in comparison to the linked list of individual descriptor entries.

Figure 1:
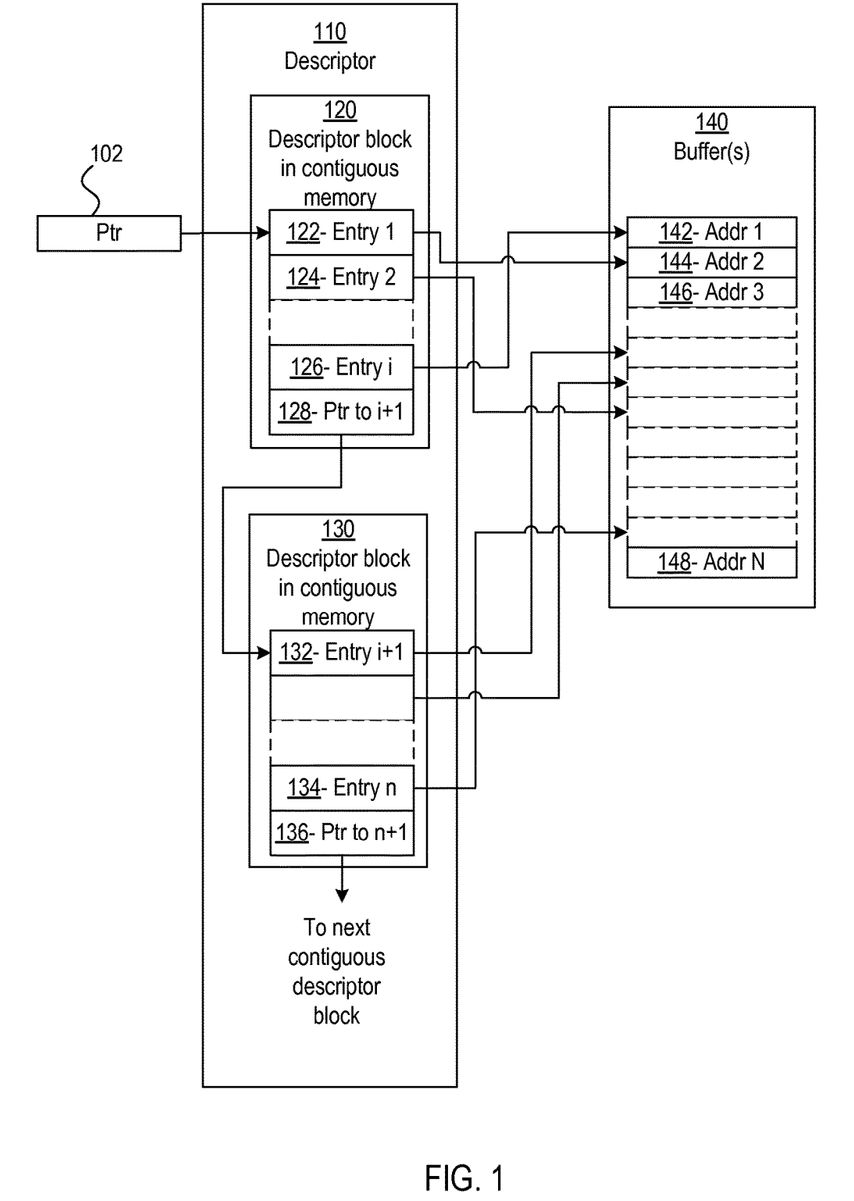
FIG. 1 shows a descriptor arrangement consistent with one or more implementations.

Turning now to the figures, FIG. 1 shows a descriptor arrangement consistent with one or more implementations. The descriptor 110 includes descriptor entries 122, 124, 126, 132, and 134 that reference a set of addresses 142, 144, 146 and 148 in one or more buffers 140, at which respective portions of a set of data to be transferred are to be read or written. For ease of reference, respective portions of a set of data to be transferred may be referred to as data segments. Use of the descriptor allows large data transfers to be conducted to or from non-contiguous memory addresses. In this example, the descriptor entries are arranged into a linked list of descriptor blocks 120 and 130. Each of the descriptor blocks 120 and 130 is configured to store a plurality of descriptor entries in sequential memory locations of a contiguous portion of a memory. Each descriptor entry may specify, for example, a starting address, where a respective data segment is located in the buffer 140, and a size of the data segment. The last memory location 128 and 136 in each of the descriptor blocks 120 and 130 is reserved for storage of a pointer that references the first memory location of the next descriptor block in the linked list. For example, the last memory location 128 in the first descriptor block 120 stores a pointer that references the first memory location 132 of the second descriptor block 130.

In some implementations, the descriptor may be referenced by a pointer 102. The pointer 102 references the first memory location of the first descriptor block in the linked list. When a data transaction is initiated, the descriptor may be traversed, starting at the memory location referenced by the pointer 102, to determine the set of locations in the buffer 140 at which data is to be read from or written to.

Figure 2:
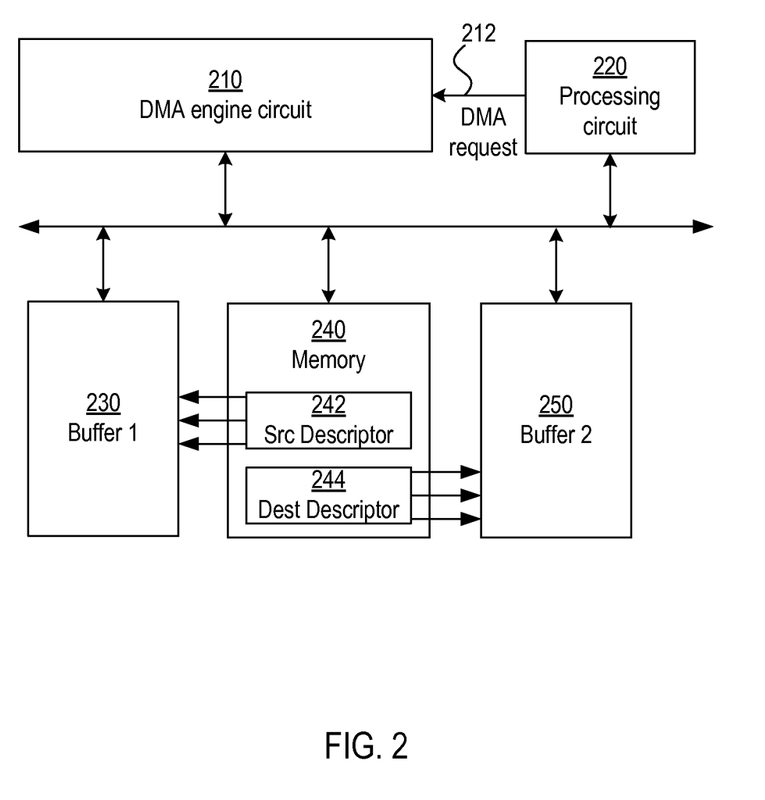
FIG. 2 shows a system including a DMA engine in accordance with one or more implementations.

FIG. 2 shows a system including a DMA engine 210 in accordance with one or more implementations. The system includes a DMA engine 210 configured to transfer data from a first buffer to a second buffer in response to a DMA request 212 from a processing circuit 220. The DMA request 212 references a source descriptor, and the source descriptor indicates a set of addresses in the first buffer 230, from which data segments are to be read. The DMA request 212 also references a destination descriptor 244, and the destination descriptor indicates a set of addresses in the second buffer 250 to which data segments are to be written. The source and destination descriptors 242 and 244 may each be formatted as discussed with reference to FIG. 1. In some implementations, the source and destination descriptors 242 and 244 are stored in a memory 240 and the DMA request 212 may include pointers that reference the source and destination descriptors 242 and 244. In some implementations, one or both of the buffers 230 and 250 may be implemented in a portion of the memory circuit 240 that is used to store the source and destination descriptors 242 and 244. In some implementations, the buffers 230 and 250 may be implemented using circuits separate from the memory 240. In some other implementations, the source and destination descriptors 242 and 244 may be provided directly to the DMA engine 210 as part of the DMA request.

Figure 3:
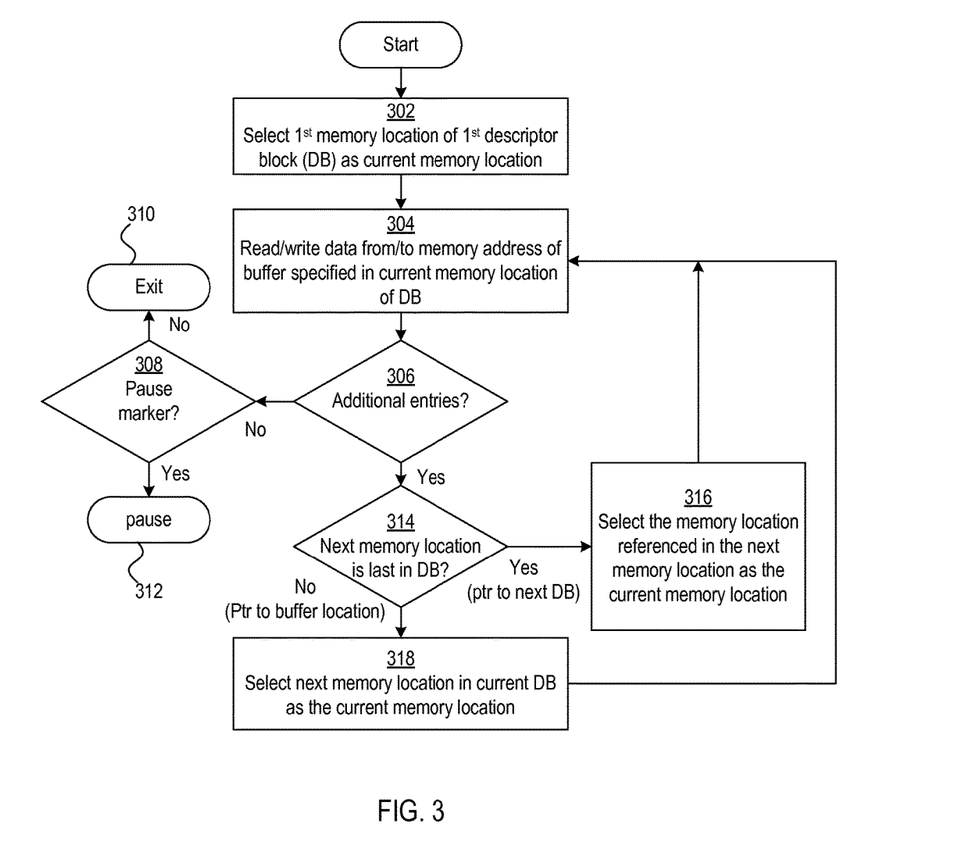
FIG. 3 shows a process for accessing memory in accordance with one or more implementations.

FIG. 3 shows a process for transferring data using descriptors configured in accordance with one or more implementations. At block 302, a first memory location of a first descriptor block (DB) is selected as a current memory location. At block 304, data is written to or read from a memory address of a buffer that is specified in a descriptor entry at the current memory location of the descriptor block. If there are no more additional entries in the descriptor, decision block 306 causes the process to proceed to decision block 308. In some implementations, a last descriptor entry in the descriptor may include a stop marker to indicate that there are no additional entries. In some implementations, a descriptor entry may include a pause marker indicating that the descriptor is not completed yet and that additional entries will be added at a later time. If the entry at the current memory location indicates a pause marker, decision block 308 causes the process to pause or stop at block 312 for a period of time. For example, the process may wait until the pause marker is removed and then continue at block 318. Otherwise, decision block 308 causes the process to exit at block 310.

If there are additional entries, decision block 306 directs the process to decision block 314. At block 316, if the next memory location following the current memory location is the last memory location of a descriptor block, decision block 314 directs the process to select an address referenced at the next memory location as the current memory location. Otherwise, if the next memory location is not the last memory location of a descriptor block, decision block 314 directs the process to the next memory location as the current memory location at block 318. After selecting a new current memory location at block 316 or block 318, the process is repeated at block 304 using the new current memory location.

Figure 4:
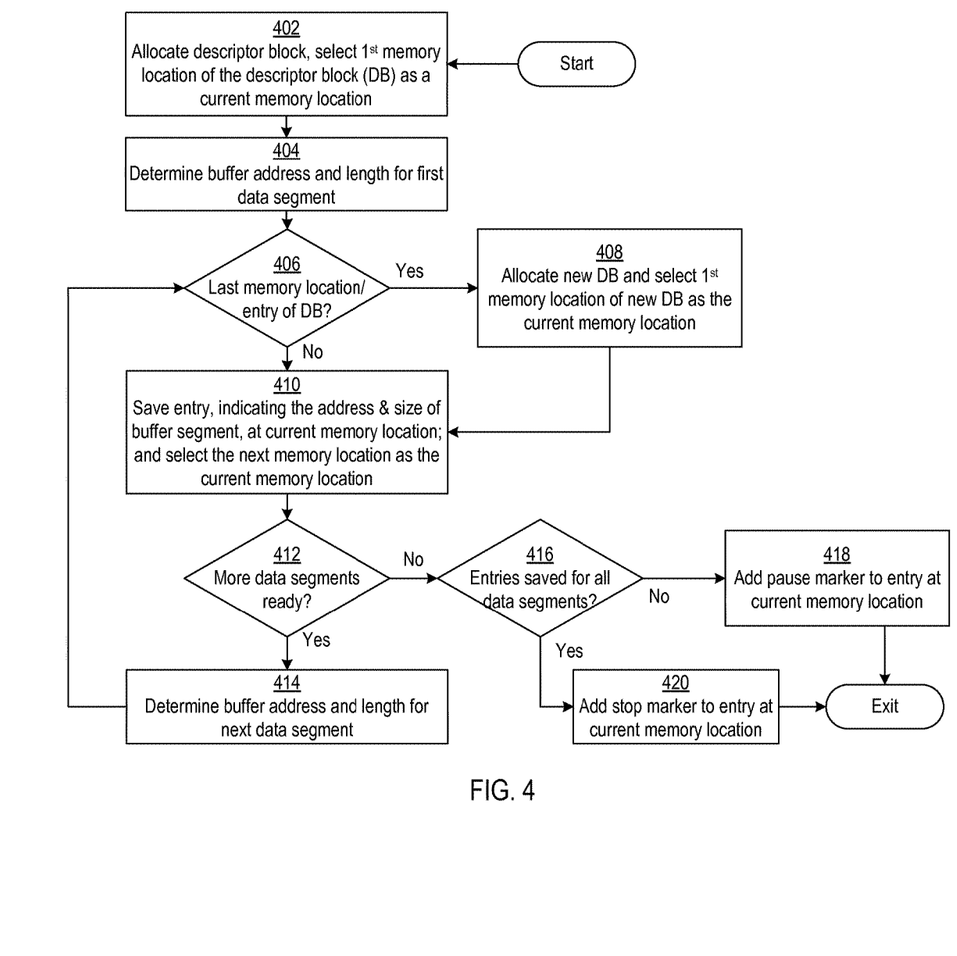
FIG. 4 shows a process for constructing a DMA descriptor in accordance with one or more implementations.

FIG. 4 shows a process for constructing a descriptor for a DMA transfer in accordance with one or more implementations. At block 402, a first descriptor block is allocated, and a first memory location of the descriptor block is selected at a current memory location. At block 404, a memory address and size are determined for a first data segment.

If the current memory location is the last memory location in the corresponding descriptor block, decision block 406 directs the process to block 408. At block 408, the process allocates a new descriptor block and selects the first memory location of the new descriptor block as the current memory location. After selecting the first memory location as the current memory location at block 408, or if the current memory location is not the last memory location at decision block 406, the process continues to block 410. At block 410, a descriptor entry indicating the determined memory address and size of the data segment is saved at the current memory location. Also at block 410, a memory location following the current memory location is selected as the current memory location. If there are additional data segments in the data transfer, decision block 412 directs the process to determine a memory address and size of the next data segment of the data transfer at block 414 and the process returns to decision block 406 to repeat the process. Otherwise, decision block 412 directs the process to decision block 416.

If entries have been added to the descriptor for all data segments of the data transfer, decision block 416 directs the process to block 420, where the process adds a stop marker to the entry at the current memory location and then exits. Otherwise, the decision block 416 directs the process to block 418, where the process adds a pause marker to the entry at the current memory location and then exits. As described with reference to FIG. 3, if a DMA engine attempts to perform a data transfer with the descriptor before creation of the descriptor has completed, the pause marker will prevent the DMA engine from continuing beyond the completed portion of the descriptor.

The disclosed methods and circuits may be used in a variety of applications and systems that utilize DMA to perform data transfers. The methods and circuits are thought to be particularly useful for use in programmable integrated circuits (ICs). One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include an embedded processor that is capable of executing a program code portion of a user design. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

Figure 5:
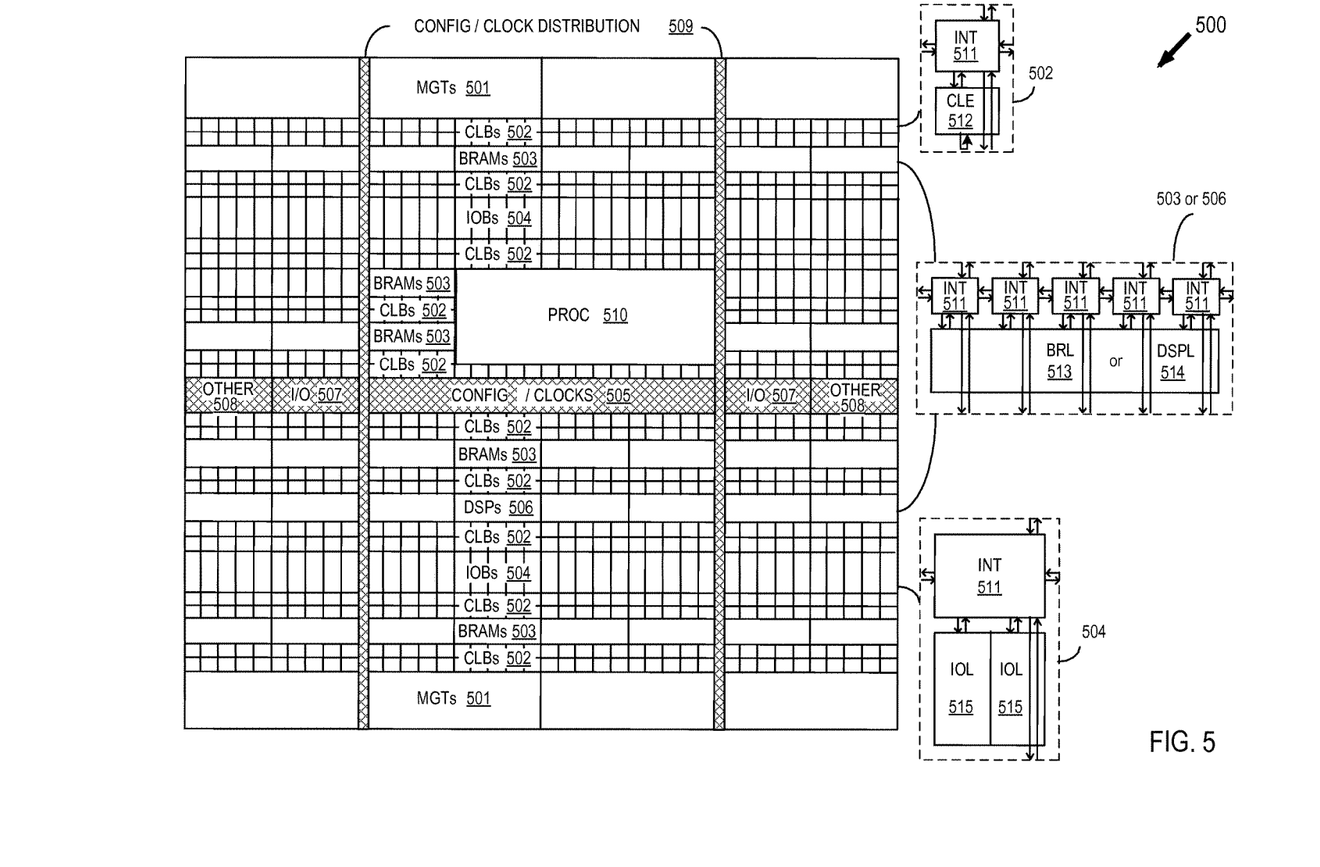
FIG. 5 shows a programmable integrated circuit (IC), which may be configured to perform DMA data transfers in accordance with one or more implementations.

FIG. 5 shows a programmable integrated circuit (IC) 500, which may be configured to perform DMA data transfers in accordance with one or more implementations. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable ICs also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the programmable IC.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

The methods and circuits are thought to be applicable to a variety of systems and applications. Other aspects and features will be apparent to those skilled in the art from consideration of the specification. For example, although aspects and features may in some cases be described in individual figures, it will be appreciated that features from one figure can be combined with features of another figure even though the combination is not explicitly shown or explicitly described as a combination. The methods and circuits may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A system comprising:
   a memory;
   a first buffer;
   a second buffer; and
   a direct memory access circuit coupled to the memory and first and second buffers and configured to:
      receive a data transfer request indicating a first descriptor and a second descriptor, wherein the first descriptor indicates a first set of addresses of the first buffer from which a set of data is to be read and the second descriptor indicates a second set of addresses of the second buffer to which the set of data is to be written;
      wherein:
         the first descriptor references a first linked list of descriptor blocks,
         the second descriptor references a second linked list of descriptor blocks, and
         each of the descriptor blocks is stored in a contiguous portion of the memory, each descriptor block stores a set of descriptor entries that references a plurality of addresses of the first or second sets of addresses, and each descriptor entry includes a marker;
      in response to receiving the data transfer request, transfer the set of data from the first set of addresses in the first buffer to the second set of addresses in the second buffer by traversing the first and second linked lists of descriptor blocks;
      in response to the marker in a descriptor entry of the first descriptor or the second descriptor being a pause marker, pausing the transfer of the set of data from the first set of addresses in the first buffer for a period of time until the pause marker is removed; and
      in response to the marker in a descriptor entry of the first descriptor or the second descriptor being a stop marker, ending the transfer the set of data from the first set of addresses in the first buffer.

2. The system of claim 1, wherein the direct memory access circuit, in the transfer of the set of data from the first set of addresses in the first buffer, is further configured and arranged to:
   select a first memory location of a first descriptor block of the first linked list as a current first memory location; and
   perform a first set of operations including:
      reading data from an address in the first buffer referenced by a descriptor entry at the current first memory location; and
      in response to the descriptor entry at the current first memory location having a data marker indicating that the first descriptor includes additional descriptor entries:
         in response to a next memory location following the current first memory location being a last memory location in a descriptor block, selecting a memory location referenced by the next memory location as a new current first memory location, and otherwise, selecting the next memory location as the new current first memory location; and
      repeating the first set of operations.

3. The system of claim 2, wherein each descriptor entry in the first and second linked lists of descriptor blocks specifies an address for a respective data segment and a size of the respective data segment.

4. The system of claim 1, wherein the direct memory access circuit, in the transfer of the set of data to the second set of addresses in the second buffer, is further configured and arranged to:
   select a first memory location of a first descriptor block of the second linked list as a current second memory location; and
   perform a second set of operations including:
      writing data to an address in the second buffer referenced by a descriptor entry at the current second memory location; and
      in response to the descriptor entry at the current second memory location having a data marker indicating that the second descriptor includes additional descriptor entries:
         in response to a next memory location following the current second memory location being a last memory location in a descriptor block, selecting a memory location referenced by the next memory location as a new current second memory location, and otherwise, selecting the next memory location as the new current second memory location; and
      repeating the second set of operations.

5. The system of claim 1, further comprising a processing circuit coupled to the direct memory access circuit and configured to provide the data transfer request to the direct memory access circuit to initiate a transfer of the set of data from the first set of addresses in the first buffer to the second set of addresses in the second buffer.

6. The system of claim 5, wherein the processing circuit is configured to generate the first descriptor by performing a set of operations including:
   for a first data segment of the set of data,
      allocating a contiguous block of memory for a first descriptor block having a plurality of memory locations;

at a first one of the plurality of memory locations of the first descriptor block, storing a starting address for the first data segment in a source buffer and a size of the first data segment;

selecting a next memory location of the first plurality of memory locations following the first one of the plurality of descriptor memory locations as a current first memory location;

for each data segment of the set of data following the first data segment:
  in response to the current first memory location being a last memory location of the descriptor block:
    allocating an additional contiguous block of memory for an additional descriptor block having a plurality of memory locations; and
    selecting a first memory location of the additional descriptor block as the current first memory location; and
  storing, at the current first memory location, a starting address for the subsequent data segment and a size of the subsequent data segment.

7. The system of claim 1, wherein each descriptor block in the first linked list references no more than one other descriptor block in the first linked list.

8. The system of claim 1, wherein providing the first descriptor to the direct memory access circuit includes providing, to the direct memory access circuit, a pointer that references a first memory location of a first descriptor block of the first linked list.

9. A method for transferring a set of data from a source buffer, comprising:
  providing to a direct memory access circuit, a first descriptor that indicates a set of addresses in the source buffer at which the set of data is located, wherein:
    the first descriptor references a first linked list of a plurality of descriptor blocks, and
    each descriptor block is stored in a contiguous portion of a memory, each descriptor block stores a plurality of descriptor entries that references a plurality of addresses of the set of addresses, and each descriptor entry includes a marker;
  selecting by the direct memory access circuit, a first memory location of a first descriptor block of the first linked list as a current first location; and
  performing by the direct memory access circuit a first set of operations including:
    reading data from an address in the source buffer referenced by the descriptor entry at the current first location;
    in response to the descriptor entry at the current first location having a data marker indicating that the first descriptor includes additional descriptor entries:
      in response to the next memory location following the current first location being a last memory location in a descriptor block, selecting a memory location referenced by the next memory location as a new current first location, and otherwise, selecting the next memory location as the new current first location; and
      repeating the first set of operations;
    in response to the marker in the descriptor entry at the current first location being a pause marker, pausing the transfer of the set of data from the source buffer for a period of time until the pause marker is removed; and
    in response to the marker in the descriptor entry at the current first location being a stop marker, ending the transfer the set of data from the source buffer.

10. The method of claim 9, further comprising:
  providing to the direct memory access circuit, a second descriptor that indicates a set of addresses in a destination buffer, wherein the second descriptor references a second linked list of a plurality of descriptor blocks, each descriptor block stored in a contiguous portion of a memory that stores a plurality of descriptor entries at respective memory locations;
  selecting by the direct memory access circuit, a first memory location of a first descriptor block of the second linked list as a current second memory location; and
  performing by the direct memory access circuit a second set of operations including:
    writing data to an address in the destination buffer referenced by the descriptor entry at the current second memory location; and
    in response to the descriptor entry at the current second memory location having a data marker indicating that the second descriptor includes additional descriptor entries:
      in response to the next memory location following the current second memory location being the last memory location in a descriptor block, selecting a memory location referenced by the next memory location as a new current second memory location, and otherwise, selecting the next memory location as the new current second memory location; and
      repeating the second set of operations.

11. The method of claim 9, further comprising, generating the first descriptor by performing operations including:
  for a first data segment of the set of data in the source buffer,
    allocating a contiguous block of memory for a first descriptor block having a plurality of memory locations;
    at a first one of the plurality of memory locations of the first descriptor block, storing a starting address for the first data segment and a size of the first data segment;
  for each data segment of the set of data following the first data segment:
    selecting a next memory location of the plurality of memory locations following the first one of the plurality of memory locations as a current third memory location;
    in response to the current third memory location being the last memory location of the descriptor block:
      allocating an additional contiguous block of memory for an additional descriptor block having a plurality of memory locations; and selecting a first memory location of the additional descriptor block
      as the current third memory location; and
    storing, at the current third memory location, a starting address for the subsequent data segment and a size of the subsequent data segment.

12. The method of claim 9, wherein each descriptor entry in the first linked list specifies an address for a respective data segment and a size of the respective data segment.

13. The method of claim 9, wherein each descriptor block in the first linked list includes no more than one memory location belonging to another descriptor block in the first linked list.

14. The method of claim 9, wherein providing the first descriptor to the direct memory access circuit includes providing, to the direct memory access circuit, a pointer that references the first memory location of a first descriptor block of the first linked list.

15. A method for creation of a descriptor for a data transfer, comprising:
for a first data segment of a data transfer to or from a data buffer,
allocating a contiguous block of memory for a first descriptor block having a plurality of descriptor entries;
in a first one of the plurality of descriptor entries of the first descriptor block, storing a starting address for the first data segment in a source buffer and a size of the first data segment; and
selecting a next descriptor entry of the first plurality of descriptor entries following a first one of the plurality of descriptor entries as a current first descriptor entry;
for each data segment of the data transfer following the first data segment:
in response to the current first memory location being a last memory location of the descriptor block:
allocating an additional contiguous block of memory for an additional descriptor block having a plurality of descriptor entries; and
selecting a first descriptor entry of the additional descriptor block as the current first descriptor entry; and
storing, at the current first descriptor entry; a starting address for the subsequent data segment and a size of the subsequent data segment;
adding a pause marker to a descriptor entry at the current first descriptor entry in response to the data transfer including additional data segments not ready for transfer; and
adding a stop marker to a descriptor entry at the current first descriptor entry in response to the data transfer including no additional data segments.

16. The method of claim 15, further comprising: generating a reference pointer indicating an address of the first one of the plurality of descriptor entries of the first descriptor block.

17. The method of claim 15, further comprising:
generating a first descriptor, indicating a set of locations in the source buffer at which the set of data is located, using the method of claim 15;
generating a second descriptor, indicating a set of locations in the destination buffer, using the method of claim 15; and
providing the first and second descriptors to a direct memory access circuit.

18. The method of claim 17, further comprising: using the direct memory access circuit, transfer data from the set of locations in the source buffer to the set of addresses in the destination buffer.

\* \* \* \* \*